Sept. 10, 1935.  A. E. HAWKE  2,014,108
JAR HOLDER
Filed July 29, 1933
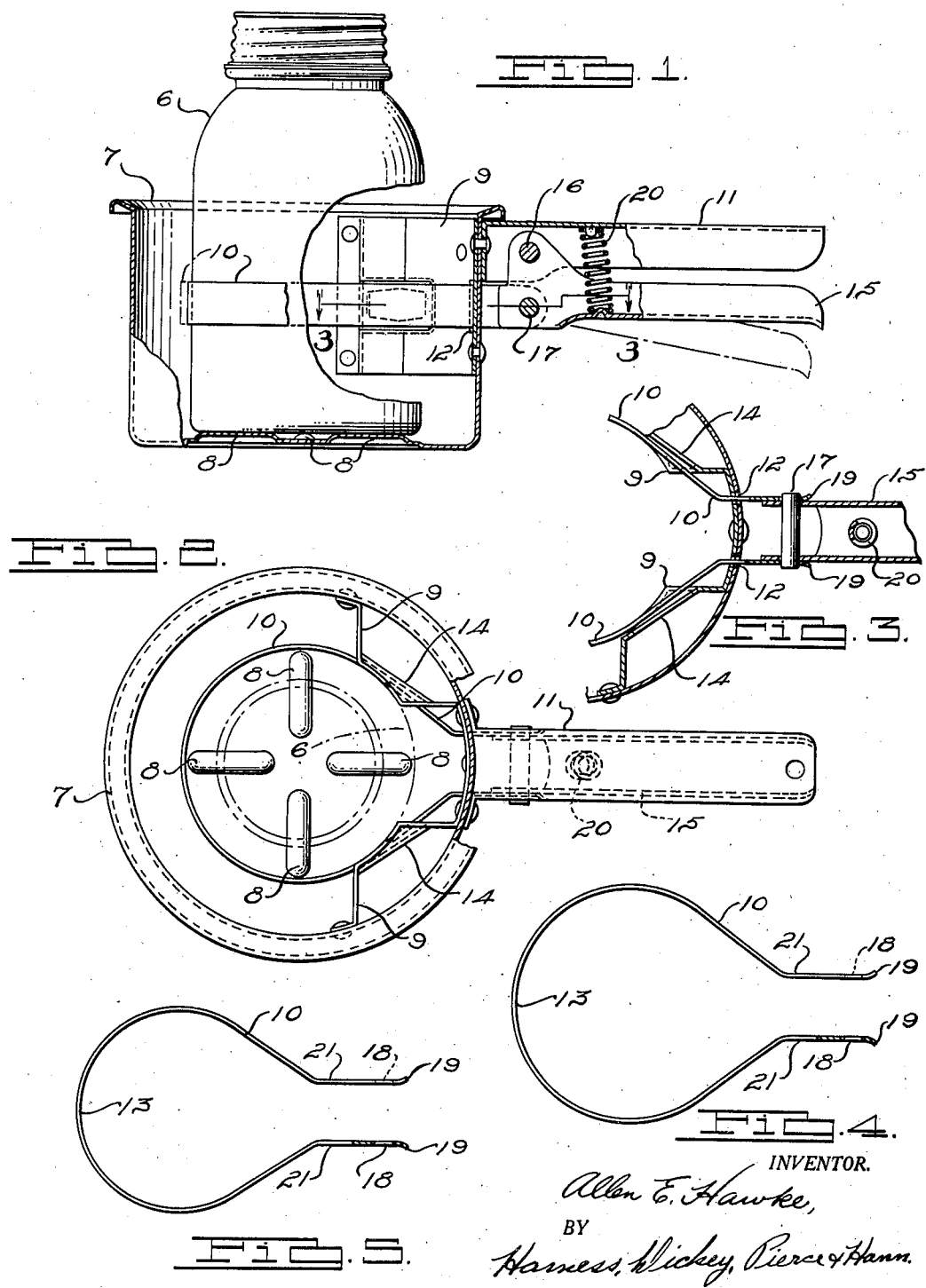
INVENTOR.
Allen E. Hawke,
BY
Harness, Dickey, Pierce & Hann.
ATTORNEYS.

Patented Sept. 10, 1935

2,014,108

UNITED STATES PATENT OFFICE 2,014,108

JAR HOLDER

Allen E. Hawke, Detroit, Mich.

Application July 29, 1933, Serial No. 682,740

4 Claims. (Cl. 81—3.3)

This invention relates to kitchen utensils and in particular to a device for holding Mason jars or the like while filling them with preserves.

Fruit preserves and the like when made in the home are generally poured into Mason jars at boiling temperature and the jars are immediately sealed. It is customary to have the jars and covers also at boiling temperature both to avoid any breakage of the jar due to sudden contact with the hot fruit preserves, and to pasteurize the jars and covers so that when the jar is sealed it is entirely free from any micro-organisms, spores, mold and the like which might cause fermentation or otherwise detract from the palatability of the contents. Considerable care is required on the part of the operator in handling these hot materials. It is the object of this invention to provide a device for conveniently manipulating the hot Mason jars during the filling and sealing operations and for catching the hot fruit preserves should the jar be filled too full or should it break while being filled.

Another object of this invention is to provide generally a device for firmly grasping Mason jars or other similarly shaped objects.

The invention will be better understood from the following description with reference to an illustrative embodiment of the invention shown in the accompanying drawing which forms part of the specification, in which:

Figure 1 is an elevational view largely in section showing the improved pan and a Mason jar of standard quart size within.

Fig. 2 is a broken plan view showing the relative positions of the pan, the arched spacers, the strap and, in broken outline, a Mason jar within the pan.

Fig. 3 is a fragmentary horizontal sectional view of a portion of the structure shown in Fig. 1 and Fig. 2, taken along the line 3—3 of Fig. 1.

Fig. 4 is a plan view partly in section showing the shape of the retaining strap.

Fig. 5 is a plan view partly in section showing the shape of a smaller retaining strap interchangeable with that shown in Fig. 4.

In the construction illustrated in the drawing, a Mason jar 6 is shown placed upright in a kitchen utensil 7 of the shape and size generally known as a sauce pan. The Mason jar 6 is supported above and in spaced relation with the bottom of the pan by four bosses 8 radially disposed in the bottom of the pan. The Mason jar 6 is retained centrally in the pan 7 on one side by a pair of circumferentially spaced stationary retaining members or shoulders in the form of arched spacers 9 between the jar and the pan and on the other side by a movable retaining member in the form of a strap 10 partially encircling the jar and drawing it against the arched spacers. The arched spacers 9 project inwardly from the inside of the pan and extend down about two-thirds of the way from the top of the pan. As shown in the drawings, both spacers may be formed from one sheet of metal appropriately bent and afterwards welded or riveted to the sidewall of the pan, according to the materials used.

The side wall of the pan centrally between the spacers and directly below the handle 11 is pierced by two axial slots 12. The strap 10 is shaped as shown in Fig. 4 in the form of an open loop, the central portion 13 being designed to horizontally encircle the Mason jar and the two ends 21 project in spaced parallel relation through the slots 12 in the side wall of the pan 7. The arched spacers 9 are each provided with a recessed central portion 14 to guide the strap 10 and to allow the jar to press against the spacers 9.

Means are provided to tighten the strap 10 around the jar 6 and draw it against the spacers 9 and comprise a bell-crank lever 15 in substantially parallel relation with and fulcrumed to the handle 11 by means of the pivot 16 and pivotally connected below the fulcrum to both ends 21 of the strap 10 by means of the lower pivot 17, which engages on each side of the lever a hole 18 in each end of the strap. A helical spring 20 between the handle 11 and the lever 15 urges the lever 15 away from the handle 11 to the position shown in Fig. 1 in broken outline.

As the lever 15 is urged to this position, the strap 10 is likewise urged, by the engagement of the pivot 17 with the ends 21 of the strap 10, to a position shown in Fig. 1 in broken outline. This movement of the strap 10 enlarges the openings between it and the arched spacers 9 and allows a convenient insertion of the jar 6.

By grasping the handle and the lever in one hand and drawing them together the lower pivot 17 moves away from the pan in an arc about the fulcrum 16 and draws the strap 10 with it. The jar 6 is gripped by the strap 10 and spacers 9 and held fixed to the pan 7. Upon releasing the pressure of the hand the lever 15 is urged away from the handle 11 by the helical spring 20 and the strap 10, as mentioned before, is moved to a position where it loosely encircles the jar.

The strap 10 is preferably made of spring steel and initially shaped so that when in position it bears outwardly against the recessed portions 14 of the spacers 9 and inwardly against the two sides of the lever 15. The two recesses 14, engaging the upper and lower edges of the loop portion of the strap 10, and the lower pivot 17, engaging the ends 21, are sufficient to hold the strap 10 in the correct horizontal plane. At the same time the strap 10 may be removed from the pan by squeezing the center portion, thus causing the ends 21 outside the slots 12 to move away from the pivot 17 which projects on each side of the lever 15 only slightly more than the thickness of the strap 10. When the holes 18 of the strap 10 are disengaged from the pivot 17 the ends 21 of the strap 10 may be drawn through the slot 12 and into the pan 7 and the entire strap 10 removed.

If it is desired to use this device with a smaller or larger jar, straps of different sizes but of the same general form may be provided as shown in Fig. 5. The insertion of any of the various straps may be accomplished by placing the strap inside the pan with the ends 21 through the slots 12 and forcing the ends 21 over the pivot 17. The extreme ends of the strap are outwardly bent as at 19 so as to ride over the pivot 17 until the holes 18 are reached.

The operation of the device is as follows. A strap 10, selected according to the size of the Mason jar 6 to be used, is connected to the pan 7. The hot Mason jar is placed upright in the pan within the opening between the arched spacers 9 and strap 10. The handle 11 is grasped in the hand and by closing the hand the lever 15 is drawn towards the handle 11 thereby tightening the strap 10 around the jar 6 and holding it firmly in the utensil. The utensil and the jar are then held in the hand or placed on the table or stove for the filling operation. After the jar is filled with fruit preserves the usual rubber ring is placed on the top and the cover fastened down. If the cover is of the screw type, this device affords a very firm grip on the jar and enables the cover to be screwed down with little difficulty.

Any fruit preserves on the side or top portion of the jar may be wiped off with a cloth or washed off by dipping the pan and jar in hot water. The pan 7 and jar 6 are then turned upside down and by somewhat loosening the grip on the handle 11 and the lever 15 and thereby loosening the strap 10, the jar 6 can be gently slid out of the pan onto a table to cool in inverted position.

Should it happen that a Mason jar cracks or breaks during the filling operation, the pan will catch the glass and the preserves and thereby avoid soiling the kitchen table or floor. The volume of the pan below the slots 12 in the side wall being somewhat greater than a quart, no liquid will overflow through them. The liquid and broken glass may be poured out of the pan into a suitable receptacle and after a quick rinsing the pan will be again ready for use.

If it is desired, a Mason jar or other object may be heated in the pan by placing the object in the pan, pouring in about a quart of water and heating over a suitable heating element. The bosses 8 support the jar in spaced relation with the bottom of the pan and prevent the formation of any steam pocket and possible melting of the bottom of the pan.

Formal changes may be made in the specific embodiment of the invention described without departing from the spirit and substance of the broad invention, the scope of which is commensurate with the appended claims.

I claim:

1. A kitchen utensil comprising a pan, a handle on said pan, a movable retaining member within said pan, a stationary retaining member within said pan, said retaining members being disposed on opposite sides of a jar or the like placed within said pan, means to cause said movable retaining member to move towards said stationary retaining member, said means being operative by grasping said handle.

2. A kitchen utensil comprising a pan provided with a handle, an arched support within said pan extending radially inwardly from the side wall thereof near said handle, a strap forming an open horizontal loop in said pan and a lever pivoted adjacent said handle so as to be grasped therewith, said lever being adapted to cause said arched support and said loop to move relatively one toward the other.

3. A kitchen utensil comprising a pan provided with a handle, an arched support within said pan extending radially inwardly from the side wall thereof near said handle, a strap forming an open horizontal loop in said pan, one end of said strap being movable relative to said pan, said arched support being formed to guide portions of said strap, and a lever pivoted adjacent said handle so as to be grasped therewith, said one end of said strap being elsewhere pivotally connected to said lever.

4. A kitchen utensil comprising a pan provided with a handle, two arched supports within said pan extending radially inwardly from the side wall thereof on either side of said handle, a strap forming an open horizontal loop in said pan, the two ends of said strap extending outwardly through the side wall of said pan and between said arch supports, said arch supports being formed to guide portions of said flexible strap, and a lever pivoted adjacent said handle so as to be operatively grasped therewith, the two ends of said strap being elsewhere removably connected to said lever.

ALLEN E. HAWKE.